(12) United States Patent
Mihaylov

(10) Patent No.: US 10,057,240 B2
(45) Date of Patent: Aug. 21, 2018

(54) SINGLE SIGN-ON TO WEB APPLICATIONS FROM MOBILE DEVICES

(71) Applicant: SAP SE, Walldorf (DE)

(72) Inventor: Dimitar Mihaylov, Gabrovo (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/467,672

(22) Filed: Aug. 25, 2014

(65) Prior Publication Data
US 2016/0057130 A1    Feb. 25, 2016

(51) Int. Cl.
| H04L 29/06 | (2006.01) |
| H04W 12/06 | (2009.01) |
| H04W 12/04 | (2009.01) |
| H04L 9/08 | (2006.01) |

(52) U.S. Cl.
CPC ........ *H04L 63/0815* (2013.01); *H04L 9/0872* (2013.01); *H04L 63/061* (2013.01); *H04W 12/04* (2013.01); *H04W 12/06* (2013.01)

(58) Field of Classification Search
CPC . H04L 63/0815; H04L 63/061; H04L 9/0872; H04W 12/06; H04W 12/04
USPC .......................................................... 726/4
See application file for complete search history.

(56) References Cited

U.S. PATENT DOCUMENTS

| 6,360,254 | B1 * | 3/2002 | Linden | G06F 17/30876 |
| | | | | 707/E17.112 |
| 7,886,032 | B1 * | 2/2011 | Louz-On | G06F 17/30887 |
| | | | | 709/217 |
| 8,219,811 | B2 * | 7/2012 | Roundtree | G06F 21/51 |
| | | | | 713/169 |
| 8,327,142 | B2 * | 12/2012 | Lund | H04L 63/0823 |
| | | | | 705/67 |
| 8,397,077 | B2 * | 3/2013 | Hoey | G06F 21/33 |
| | | | | 713/184 |
| 8,438,184 | B1 * | 5/2013 | Wang | H04L 67/306 |
| | | | | 707/780 |
| 8,588,413 | B1 * | 11/2013 | Kalbag | H04W 12/06 |
| | | | | 380/46 |
| 8,839,395 | B2 * | 9/2014 | Poliashenko | G06F 21/41 |
| | | | | 713/172 |
| 8,898,746 | B2 * | 11/2014 | Gregg | H04L 63/10 |
| | | | | 726/29 |
| 9,118,662 | B2 * | 8/2015 | Corrion | H04L 63/0838 |
| 9,246,882 | B2 * | 1/2016 | Oliver | G06F 21/73 |
| 2002/0007460 | A1 * | 1/2002 | Azuma | H04L 63/0815 |
| | | | | 726/12 |

(Continued)

OTHER PUBLICATIONS

Bawaskar, S., et al, 'Enhanced SSO based Multi-Factor Authentication for Web Security', (IJCSIT) International Journal of Computer Science and Information Technologies, vol. 7 (2) , 2016, 960-966, https://pdfs.semanticscholar.org/eab1/94c11a9e57e7ef7d188494ba4f7a60e729ba.pdf.*

(Continued)

*Primary Examiner* — Luu Pham
*Assistant Examiner* — Ronald Baum
(74) *Attorney, Agent, or Firm* — Jones Day

(57) ABSTRACT

A mobile device may include an authenticator and a processor. The authenticator may store a first secret corresponding to a second secret stored on a server and generating a key based upon the first secret. The processor may embed the key in data communicated to the server to request access from the server.

20 Claims, 5 Drawing Sheets

(56) References Cited

U.S. PATENT DOCUMENTS

| | | | | |
|---|---|---|---|---|
| 2002/0174341 A1* | 11/2002 | Logue | H04L 63/123 | 713/179 |
| 2002/0199119 A1* | 12/2002 | Dunnion | H04L 63/0428 | 726/4 |
| 2003/0012382 A1* | 1/2003 | Ferchichi | H04L 63/062 | 380/270 |
| 2003/0031320 A1* | 2/2003 | Fan | H04L 63/04 | 380/255 |
| 2003/0158960 A1* | 8/2003 | Engberg | G06Q 20/02 | 709/237 |
| 2004/0006693 A1* | 1/2004 | Vasnani | H04L 63/0807 | 713/168 |
| 2005/0278538 A1* | 12/2005 | Fowler | H04L 9/3271 | 713/182 |
| 2006/0034456 A1* | 2/2006 | McGough | H04L 9/0844 | 380/30 |
| 2006/0075224 A1* | 4/2006 | Tao | G06F 21/121 | 713/164 |
| 2006/0083228 A1* | 4/2006 | Ong | G06F 21/34 | 370/389 |
| 2006/0117015 A1* | 6/2006 | Bisbee | G06F 21/33 | |
| 2006/0206709 A1* | 9/2006 | Labrou | G06Q 20/18 | 713/167 |
| 2007/0300294 A1* | 12/2007 | Netanel | H04L 63/06 | 726/5 |
| 2008/0059804 A1* | 3/2008 | Shah | G06F 21/41 | 713/186 |
| 2008/0183839 A1* | 7/2008 | Shuqair | G06F 17/30905 | 709/217 |
| 2009/0070469 A1* | 3/2009 | Roach | H04M 7/123 | 709/226 |
| 2009/0119759 A1* | 5/2009 | Taugbol | H04L 63/0853 | 726/6 |
| 2009/0319776 A1* | 12/2009 | Burch | H04L 63/08 | 713/155 |
| 2010/0192210 A1* | 7/2010 | Purdy, Sr. | G06F 21/10 | 726/7 |
| 2010/0228989 A1* | 9/2010 | Neystadt | G06F 21/10 | 713/185 |
| 2010/0332841 A1* | 12/2010 | Watts | G06F 21/43 | 713/182 |
| 2011/0197266 A1* | 8/2011 | Chu | H04L 9/3228 | 726/5 |
| 2011/0225417 A1* | 9/2011 | Maharajh | G06F 21/10 | 713/150 |
| 2011/0283110 A1* | 11/2011 | Dapkus | G06F 21/577 | 713/182 |
| 2011/0302638 A1* | 12/2011 | Cha | G06F 21/57 | 726/6 |
| 2012/0096543 A1* | 4/2012 | Adi | G06Q 10/06 | 726/18 |
| 2012/0209630 A1* | 8/2012 | Ihm | G06Q 20/3274 | 705/4 |
| 2012/0254959 A1* | 10/2012 | Schmidt | H04L 63/061 | 726/6 |
| 2012/0330769 A1* | 12/2012 | Arceo | G06Q 20/4014 | 705/21 |
| 2013/0012159 A1* | 1/2013 | Lodeweyckx | H04W 8/183 | 455/406 |
| 2013/0055368 A1* | 2/2013 | Bauckman | H04L 51/24 | 726/7 |
| 2013/0061036 A1* | 3/2013 | Oliver | G06F 21/73 | 713/150 |
| 2013/0124292 A1* | 5/2013 | Juthani | G06F 21/41 | 705/14.26 |
| 2013/0132854 A1* | 5/2013 | Raleigh | G06F 3/0482 | 715/738 |
| 2013/0133086 A1* | 5/2013 | Liberman | G09C 5/00 | 726/28 |
| 2013/0167204 A1* | 6/2013 | Gregg | G06F 21/335 | 726/4 |
| 2013/0173915 A1* | 7/2013 | Haulund | H04L 9/3226 | 713/159 |
| 2013/0191899 A1* | 7/2013 | Eldefrawy | H04L 9/3228 | 726/6 |
| 2013/0198516 A1* | 8/2013 | Fenton | H04L 63/0869 | 713/168 |
| 2013/0282589 A1* | 10/2013 | Shoup | G06Q 20/388 | 705/67 |
| 2014/0012751 A1* | 1/2014 | Kuhn | G06Q 20/36 | 705/41 |
| 2014/0068270 A1* | 3/2014 | Shenoy | G06F 21/34 | 713/182 |
| 2014/0096215 A1* | 4/2014 | Hessler | H04L 63/0869 | 726/7 |
| 2014/0173700 A1* | 6/2014 | Awan | H04L 63/107 | 726/4 |
| 2014/0208407 A1* | 7/2014 | VanBlon | G06F 21/41 | 726/8 |
| 2014/0237248 A1* | 8/2014 | Striem-Amit | H04L 9/0844 | 713/171 |
| 2014/0250511 A1* | 9/2014 | Kendall | H04L 63/0815 | 726/6 |
| 2014/0331279 A1* | 11/2014 | Aissi | G06F 21/53 | 726/1 |
| 2014/0358777 A1* | 12/2014 | Gueh | G06Q 20/3223 | 705/43 |
| 2014/0373170 A1* | 12/2014 | Brudnicki | G06F 21/604 | 726/27 |
| 2015/0058931 A1* | 2/2015 | Miu | H04L 63/126 | 726/3 |
| 2015/0349966 A1* | 12/2015 | Dimitrakos | H04L 9/3271 | 713/168 |

OTHER PUBLICATIONS

Rhermini, S., 'Identity, Access Management and Single Sign-On Web-based Solutions', 2012, KTH Information and Communication Technology (TRITA-ICT-EX-2012:11), entire document, http://www.diva-portal.org/smash/get/diva2:512852/FULLTEXT01.pdf.*

* cited by examiner

100

100

300

400

SINGLE SIGN-ON TO WEB APPLICATIONS FROM MOBILE DEVICES

FIELD

The present invention relates generally to user authentication on a mobile device through a network.

BACKGROUND

As mobile solutions and mobile applications become increasingly complex, so do security protocols and user authentication protocols. Many mobile users may prefer convenient and easy to use authentication solutions, even at the cost of lower security. In particular, most of the users may find it too cumbersome to remember and enter passwords for various different applications on mobile devices. Some sign-on/authentication techniques assume that the user is in the secured corporate network, and not connected via an outside/public network. However, this may not be true for the majority of the mobile scenarios and these standard techniques cannot be used.

Thus, there is a need for an improved solution which will enable secure access with simple user authentication from mobile devices through various different network connection types.

DETAILED DESCRIPTION

Figure 1:
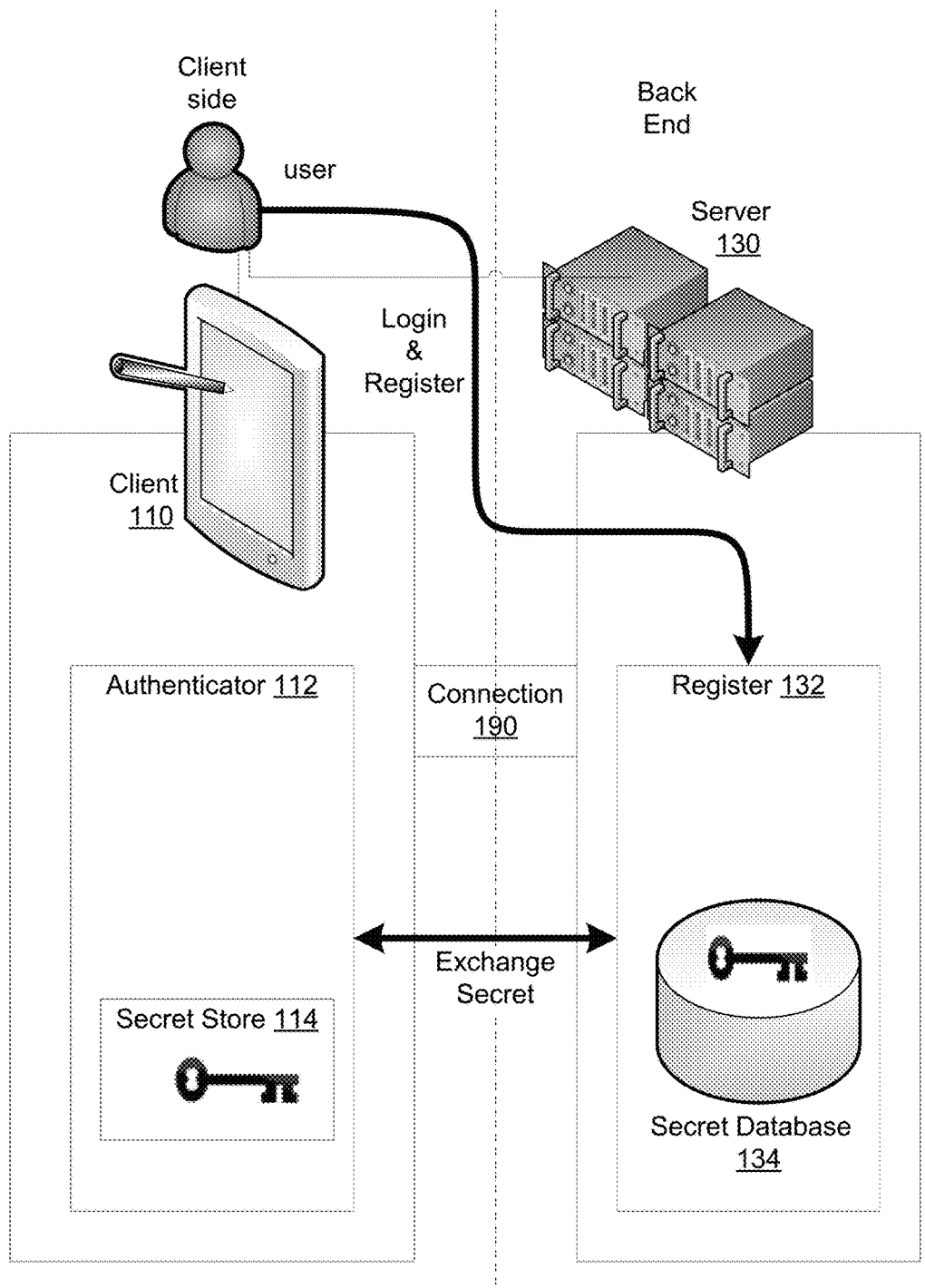
FIG. 1 illustrates an exemplary mobile device in a communication network according to an embodiment.

FIG. 1 illustrates an exemplary mobile device in a communication network 100 according to an embodiment.

According to an embodiment, in a network 100, a client/mobile device 110 on the client side may include an authenticator 112, which may include a store 114 for a secret (e.g., a segment of data or alpha-numerical sequence). On the back end side, a server 130 may include a register 132, which may include a database 134 for a secret. The client 110 may communicate with the server 130 via a connection 190. The authenticator 112 may store a first secret corresponding to a second secret stored on the server 130 and generate a key based upon the first secret. The register 132 may store a second secret corresponding to a first secret stored on the mobile device 110, used to match the second secret to a key generated based upon the first secret.

FIG. 1 illustrates an exemplary registration for the mobile device 110 to enable single sign on authentication.

The user may register the mobile device 110 with the server 130. The user may interact directly with the server 130 to initiate the registration, by logging onto the server 130 securely on a secured terminal, and then interacting with the register 132. This may include having the server 130 generate a secret, in the form of a segment of data or alpha-numerical sequence, and storing the secret into the secret database 134. This secret may be generated based on a random or pseudo-random number. The secret may be generated as uniquely associated with each specific mobile device, by for example, generating the secret using a random seed number based at least partly upon the mobile device's unique device serial number, or the device's International Mobile Station Equipment Identity (IMEI) number. The user may input the random seed number into the server 130 and the register 132 using manual keyboard input, or by optically scanning the barcodes of the mobile device 110 for its serial number or its IMEI number into the server 130 and the register 132, or by connecting the mobile device 110 directly to the server 130 and having the server 130 or the register 132 scan, through a USB cable for example, the mobile device 110 for its serial number or its IMEI number.

Once the register 132 generates the secret, the server 130 may share or securely exchange the secret with the authenticator 112 on the mobile device 110. This sharing/exchanging may be done by for example, having the server 130 display a QR code or a bar code that encodes the secret, and then having the mobile device 110 scan in the QR code or the bar code and storing the secret into the secret store 114. Then, the mobile device 110 has a first secret that matches a second secret stored on the server 130.

Alternatively, the mobile device 110 and the server 130 may each generate their own separate secret, and then synchronize with each other, to combine the two separate secrets, by for example, concatenation, multiplication with each other, etc. which results in a combined secret. Then, the combined secret is copied to both the mobile device 110 and the server 130, as the shared secret.

On the mobile device 110, the authenticator 112 may register individual programs and applications that are specifically allowed to interface with the authenticator 112 to receive keys/tokens to be used for requesting access by the programs and applications from the server 130.

Figure 2:
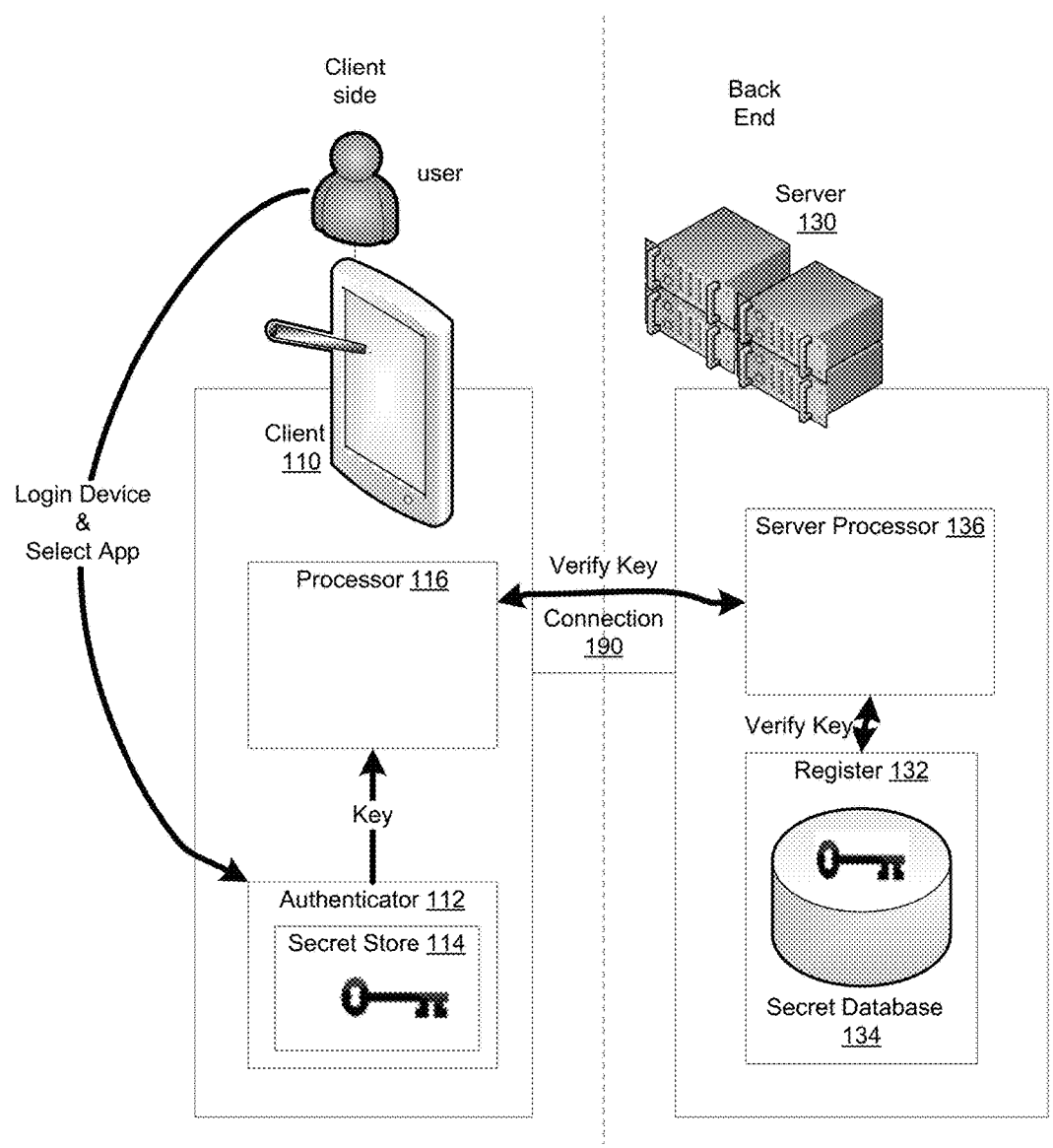
FIG. 2 illustrates an exemplary mobile device in a communication network according to an embodiment.

FIG. 2 illustrates an exemplary mobile device in a communication network 100 according to an embodiment.

According to an embodiment, the client/mobile device 110 may further include a processor 116. On the back end side, a server 130 may further include a server processor 136. The processor 116 may embed a key in data communicated to the server 130 to request access from the server 130. The server processor 136 may authenticate a request for access from the mobile device 110 that embeds the key in data communicated to the server 130 to request access from the server 130, based upon matching of the second secret to the key in the register 132.

FIG. 2 illustrates an exemplary authentication for the mobile device 110 to request access from server 130.

During authentication, the user may initiate the authenticator 112 by logging in on the mobile device 110 that was previously registered with the server 130. The mobile device 110 and/or the authenticator 112 may request the user for initial authentication via a password or a pin as a first step. The user may select a program or application to be executed in the processor 116 on the mobile device 110, to request access to the server 130. The authenticator 112 may generate a key, such as a One-Time-Password (OTP) token. The processor 116 may embed the key in data communicated to the server 130 to request access from the server 130. The mobile application (for example, a web browser) may embed an URL with the OTP token to the server 130. The key may be regenerated as a new key for each new request for access, each new request for data, or each session, etc., such that the key is seldom or never repeated in use. The trigger of new key use may be based upon predetermined time period or some data even or some program event.

The key may be generated based partly on the secret, and partly on a temporary number that's common to the mobile device 110 and the server 130, for example, the web session ID number or a time-stamp associated with the request for access. The key may be generated using a predetermined algorithm using the secret, such as a symmetric key algorithm, a RSA algorithm, a AES algorithm, a DES algorithm, etc.

The server processor 136 may handle the request for access from the mobile device 110. The server processor 136 may parse the request to parse out the key, and pass along the key to the register 132 for verification. The register 132 may compare or match the key to the secret stored in the secret database 134. This comparing or matching may be done by for example, having the register 132 generate its own key based upon the secret in the secret database 134 using the same predetermined algorithm as the mobile device 110, and then comparing its own key to the key parsed from the request from the mobile device 110.

If a mobile device is stolen or lost then it only has to be unregistered from the backend system. This step may be sufficient because it does not contain the actual password of the user for the backend system. Shared mobile devices can be supported by having user profiles in the authenticator app.

The benefits of the above system of user authentication may include:

1. The user's (corporate) password need not be entered and stored on the mobile device 110.
2. The potentially untrusted mobile applications do not have access to the user's private credentials (shared secret) but only to an OTP token that cannot be re-used.
3. The user has to enter on the mobile device at most a device PIN, if the secure storage of the authenticator application is encrypted, and then have single sign-on to all registered applications on the mobile device 110.
4. The authenticator 112 may easily provide multi-user functionality by supporting multiple user profiles each protected with a personal PIN.

Different programs/applications may be used with this authentication, such as standard or classic web-based applications, hybrid or containerized web-based applications, etc.

Figure 3:
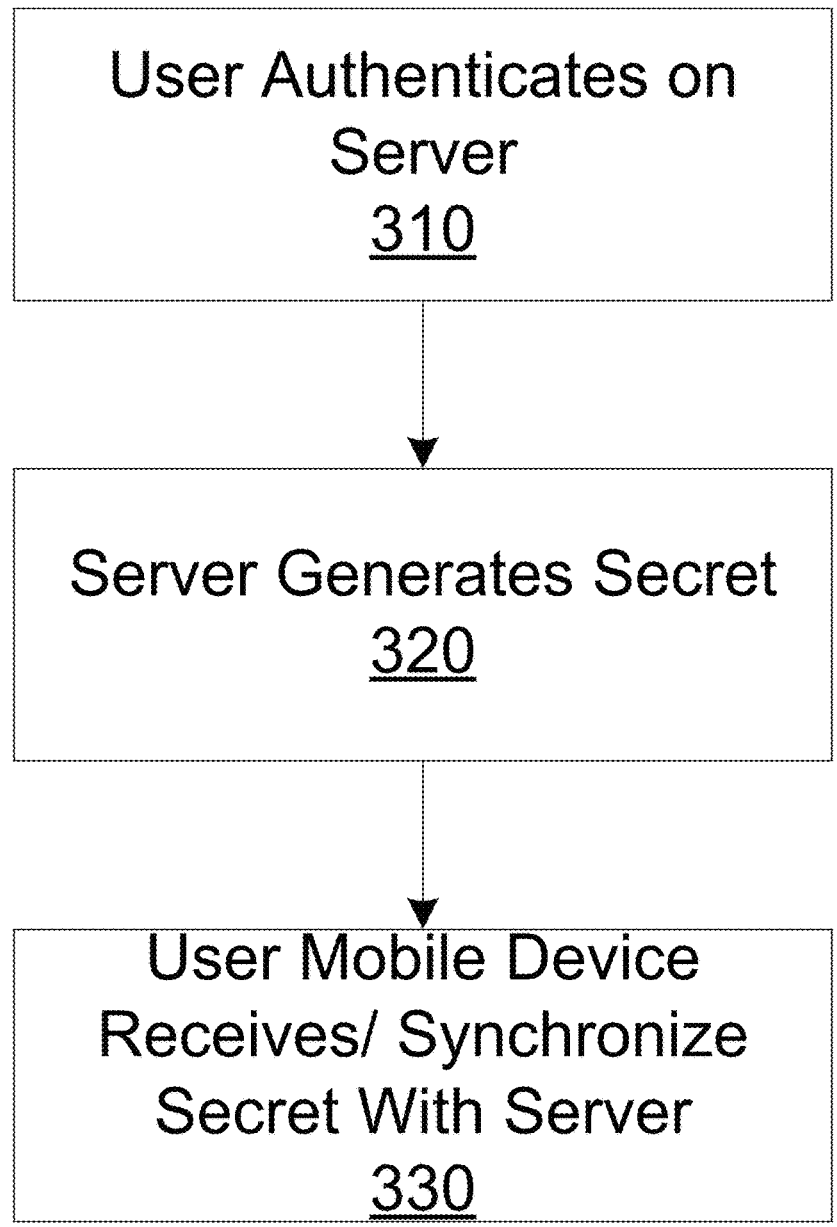
FIG. 3 illustrates an exemplary process according to an embodiment.

FIG. 3 illustrates an exemplary process 300 for registering a mobile device 110, according to an embodiment.

According to an embodiment, the process 300 may begin with the user logging in or authenticating on the server 130 at 310.

At 320, the server 130 may generate a secret.

At 340, the mobile device 110 and the server 130 may synchronize or exchange the secret, such that both the mobile device 110 and the server 130 share the same secret.

Figure 4:
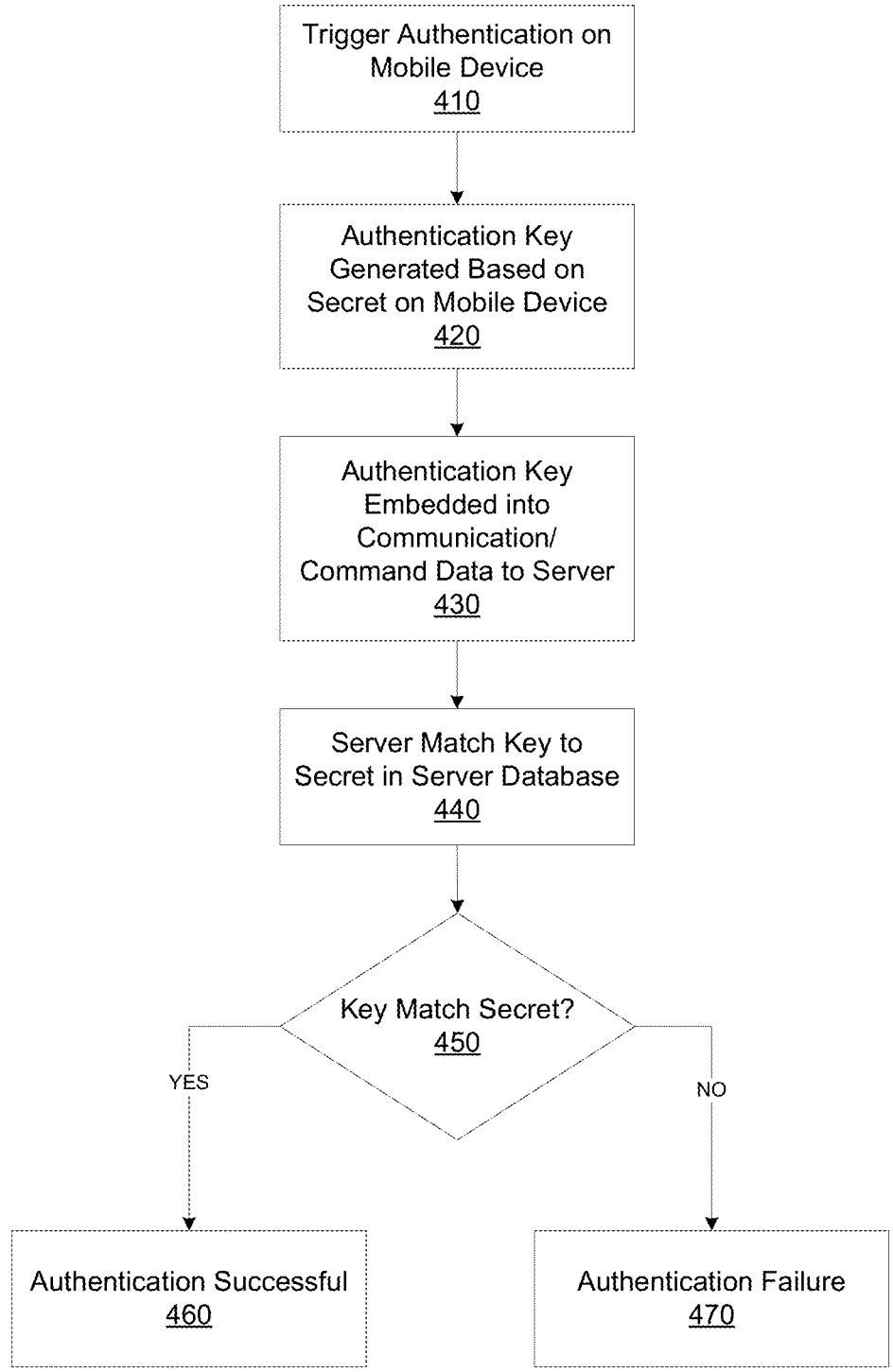
FIG. 4 illustrates an exemplary process according to an embodiment.

FIG. 4 illustrates an exemplary process 400 for authenticating the user's mobile device 110 that was previously registered with the server 130, according to an embodiment.

According to an embodiment, the process 400 may begin with the user triggering the authentication on the mobile device 110 at 410.

At 420, the authenticator 112 may generate a key based on the secret stored in the mobile device for a selected program/application.

At 430, the processor 116 executing the program/application may embed the key into the communication/command data for requesting access from the server 130.

At 440, the server processor 136 may parse and send the key received from the mobile device 110 to the register 132 for matching.

At 450, the register 132 may determine if the key matches the secret stored in the server 130.

At 460, if the key matches the secret, authentication is deemed successful, and the server may allow the request for access.

At 470, if the key does not match the secret, authentication is deemed a failure, and the server may disallow the request for access.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They maybe linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
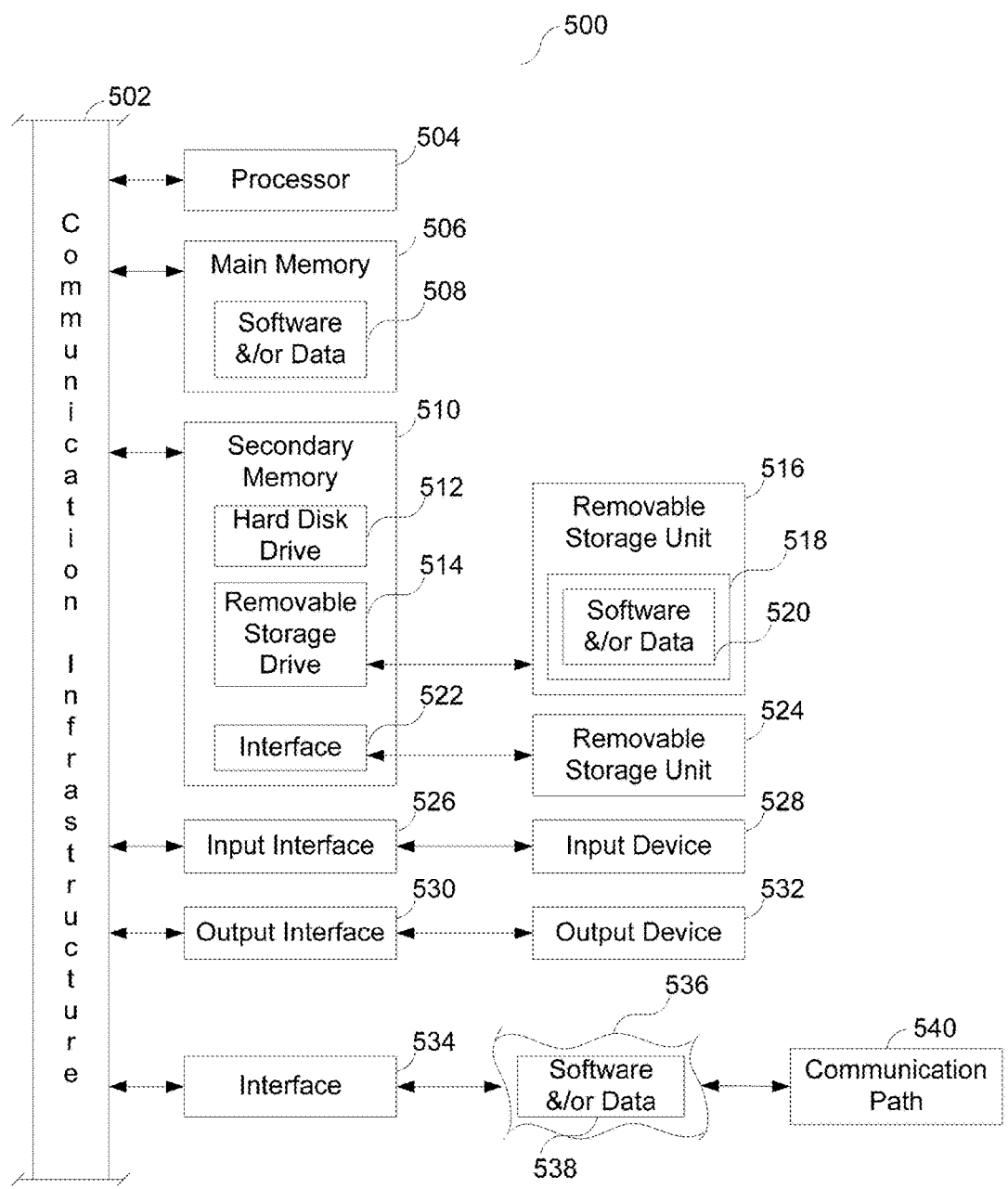
FIG. 5 illustrates an exemplary system according to an embodiment.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500. The client device 110 and the server 130 may each be a computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present invention as discussed herein. In particular, the computer programs, when executed, enable processor 504 to implement the processes of aspects of the above. Accordingly, such computer programs represent controllers of the computer system 500. Where the invention is implemented using software, the software may be stored in a computer program product and loaded into computer system 500 using removable storage drive 514, interface 522, hard drive 512 or communications interface 534.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Micro-electromechanical Systems (MEMS), nanotechnological storage device, etc.), and communication mediums (e.g., wired and wireless communications networks, local area networks, wide area networks, intranets, etc.).

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

A data provider may be an information resource. Data provider may include sources of data that enable data storage and retrieval. Data provider may include databases, such as, relational, transactional, hierarchical, multi-dimensional (e.g., Online Analytic Processing—OLAP), object oriented databases, and the like. Further data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The semantic layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, and can provide calculations associated with the underlying data.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

For simplicity of exposition, the term 'database' was employed in aspects of the above discussion. It will be readily apparent to one of ordinary skill in the art that in the context of the above discussion the scope of that term is not limited just to for example a database management system but rather encompasses inter alia any data source, data model, etc.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

I claim:

1. A mobile device comprising:
a hardware processor;
a data store; and
a single sign-on authenticator application initiated in response to a user selection of an application on the mobile device after authentication of a single Personal Identification Number (PIN) associated with a user profile, the single sign-on authenticator application configured to receive a single entry of the single PIN to provide future access to one or more applications and executed by the hardware processor, causing the hardware processor to:
obtain and store a first secret in the data store, wherein the first secret matches a second secret stored on a database of one or more servers, wherein the second secret or an initial secret from which the second secret is generated by the one or more servers prior to the obtaining of the first secret, and wherein the first secret and the second secret are unique to the mobile device;
responsive to a request for access to the one or more servers by another application on the mobile device, retrieve the first secret from the data store and generate, using a predetermined algorithm, a unique key based upon a multiplicative combination of the first secret and a session ID number associated with the request for access, wherein the first secret is unique from the session ID number; and
regenerating the unique key responsive to subsequent requests for access to the one or more servers by another application on the mobile device;
wherein the mobile device is registered with the one or more servers during a registration process at the one or more servers,
wherein the hardware processor embeds the unique key in a Uniform Resource Locator (URL) communicated to the one or more servers, thereby transmitting the request for access to the one or more servers, and
wherein the hardware processor generates a second initial secret and matches the initial secret with the second secret such that the second secret is generated as a combination of the initial secret and the second initial secret.

2. The mobile device of claim 1, wherein the second secret is generated based on at least a pseudo-random number.

3. The mobile device of claim 1, wherein the second secret is generated based on at least a unique mobile device serial number associated with the mobile device.

4. The mobile device of claim 1, wherein the hardware processor obtains the first secret by processing a Quick Response (QR) code on which the second secret is encoded.

5. The mobile device of claim 1, wherein the one or more servers generates the initial secret.

6. The mobile device of claim 1, wherein the predetermined algorithm comprises a symmetric key algorithm, an RSA algorithm, an AES algorithm or a DES algorithm.

7. A server comprising:
a register storing, within a database of the register, a user profile corresponding to a mobile device registered with the server during a registration process at the server and a second secret corresponding to a first secret stored on a mobile device, wherein the first secret and the second secret are unique to the mobile device; and
a hardware processor configured to:
generate the second secret or an initial secret from which the second secret is derived; and
authenticate a request for access from the mobile device initiated in response to a user selection of an application on the mobile device after an authentication of a single Personal Identification (PIN) associated with the registered user profile, wherein a single entry of the single PIN provides future access to one or more applications by:
extracting a first key embedded in a Uniform Resource Locator (URL) of the request for access, wherein the first key is generated, at the mobile device using a predetermined algorithm, based upon a multiplicative combination of the first secret and a session ID number associated with the request for access, wherein the first secret is unique from the session ID number;
generating a second key using the second secret;
compare the first key to the second key;
grant access to the server if the first key matches the second key;
regenerating the first key and the second key responsive to subsequent requests for access from the mobile device initiated in response to another user selection of another application on the mobile device;
generating a second initial secret; and
matching the initial secret with the second secret such that the second secret is generated as a combination of the initial secret and the second initial secret.

8. The server of claim 7, wherein the second secret is generated based on at least a pseudo-random number.

9. The server of claim 7, wherein the first secret is same as the second secret if the first key matches the second key.

10. The server of claim 7, wherein the second secret is generated based on at least a unique mobile device serial number associated with the mobile device provided during the registration process.

11. The server of claim 7, wherein the second key is generated based on the second secret and at least one of a session ID number and a time stamp associated with the request for access.

12. The server of claim 7, wherein the predetermined algorithm comprises a symmetric key algorithm, an RSA algorithm, an AES algorithm or a DES algorithm.

13. A method of a mobile device comprising:
obtaining and storing, by a hardware processor based on instructions of a single sign-on authenticator application initiated in response to a user selection of an application on the mobile device after an authentication of a single Personal Identification Number (PIN) associated with a user profile, the single sign-on authenticator application configured to receive a single entry of the single PIN to provide future access to one or more applications, a first secret matching a second secret stored on a database of one or more servers, wherein the second secret or an initial secret from which the second secret is generated by the one or more servers prior to the obtaining of the first secret and the first secret and the second secret are unique to the mobile device, and wherein the mobile device is registered with the one or more servers during a registration process at the one or more servers;

responsive to a request for access to the one or more servers by another application on the mobile device, retrieving, by the hardware processor, the first secret from the data store and generating, using a predetermined algorithm, a unique key based upon a multiplicative combination of the first secret and a session ID number associated with the request for access, wherein the first secret is unique from the session ID number;

embedding, by the hardware processor, the unique key in a Uniform Resource Locator (URL) communicated to the one or more servers, thereby transmitting the request for access to the one or more servers;

regenerating the unique key responsive to subsequent requests for access to the one or more servers by another application on the mobile device;

generating a second initial secret; and matching the initial secret with the second secret such that the second secret is generated as a combination of the initial secret and the second initial secret.

14. The method of claim 13, wherein the second secret is generated based on at least a pseudo-random number.

15. The method of claim 13, wherein the second secret is generated based on at least a unique mobile device serial number associated with the mobile device.

16. A method comprising:

storing, by a register to a database within the register, a user profile corresponding to a mobile device registered with one or more servers during a registration process at the one or more servers and a second secret corresponding to a first secret stored on a mobile device, wherein the first secret and the second secret are unique to the mobile device; and at a hardware processor of the one or more servers:

generating the second secret or an initial secret from which the second secret is derived;

authenticating, via a single sign-on, a request for access from the mobile device initiated in response to a user selection of an application on the mobile device after authentication of a single Personal Identification Number (PIN) associated with a user profile, wherein a single entry of the single PIN provides future access to one or more applications by:

extracting a first key embedded in a Uniform Resource Locator (URL) of the request for access, wherein the first key is generated, at the mobile device using a predetermined algorithm, based upon a multiplicative combination of the first secret and a session ID number associated with the request for access, wherein the first secret is unique from the session ID number;

generating a second key using the second secret;

comparing the first key to the second key;

granting access to the one or more servers if the first key matches the second key;

regenerating the first key and the second key responsive to subsequent requests for access from the mobile device initiated in response to another user selection of another application on the mobile device;

generating a second initial secret; and matching the initial secret with the second secret such that the second secret is generated as a combination of the initial secret and the second initial secret.

17. The method of claim 16, wherein the second secret is generated based on at least a pseudo-random number.

18. The method of claim 16, wherein the first secret is the same as the second secret if the first key matches the second key.

19. The method of claim 16, wherein the second secret is generated based on at least a unique mobile device serial number associated with the mobile device provided during the registration process.

20. The method of claim 16, wherein the second key is generated based on the second secret and at least one of a session ID number and a time stamp associated with the request for access.

* * * * *